(12) United States Patent
Schill

(10) Patent No.: US 8,044,533 B2
(45) Date of Patent: Oct. 25, 2011

(54) SOLAR MODULE AND METHOD OF CONTROLLING OPERATION OF A SOLAR MODULE

(75) Inventor: Christoph Schill, Ravensburg (DE)

(73) Assignee: Diehl AKO Stiftung & Co. KG, Wangen (DE)

( * ) Notice: Subject to any disclaimer, the term of this patent is extended or adjusted under 35 U.S.C. 154(b) by 784 days.

(21) Appl. No.: 12/029,498

(22) Filed: Feb. 12, 2008

(65) Prior Publication Data

US 2010/0277218 A1    Nov. 4, 2010

(30) Foreign Application Priority Data

Mar. 13, 2007   (DE) .......................... 10 2007 012 590

(51) Int. Cl.
*H02J 1/00*   (2006.01)
(52) U.S. Cl. ......................................................... 307/39
(58) Field of Classification Search .................... 307/39
See application file for complete search history.

(56) References Cited

U.S. PATENT DOCUMENTS

| | | | |
|---|---|---|---|
| 6,291,764 B1* | 9/2001 | Ishida et al. | .................. 322/2 R |
| 2002/0041505 A1* | 4/2002 | Suzui et al. | ..................... 363/95 |

* cited by examiner

*Primary Examiner* — Rexford Barnie
*Assistant Examiner* — Dru Parries
(74) *Attorney, Agent, or Firm* — Laurence A. Greenberg; Werner H. Stemer; Ralph E. Locher

(57) ABSTRACT

A solar module includes a solar generator for converting incident radiation into electrical power and a solar inverter for feeding the power generated by the solar generator into a power supply system or a load. A variable bias load is connected in parallel with the solar generator and a control device, which drives the variable bias load, detects a presently available power of the solar generator as well as a present no-load loss of the solar inverter, compares the detected power of the solar generator and the detected no-load loss of the solar inverter and enables the power of the solar generator to be fed into the power supply system or the load by the solar inverter only when the detected power of the solar generator exceeds the detected no-load loss of the solar inverter. A method of controlling operation of a solar module is also provided.

16 Claims, 2 Drawing Sheets

SOLAR MODULE AND METHOD OF CONTROLLING OPERATION OF A SOLAR MODULE

CROSS-REFERENCE TO RELATED APPLICATION

This application claims the priority, under 35 U.S.C. §119, of German Patent Application DE 10 2007 012 590.0, filed Mar. 13, 2007; the prior application is herewith incorporated by reference in its entirety.

BACKGROUND OF THE INVENTION

Field of the Invention

The present invention relates to a solar module including a solar generator for converting incident radiation into electrical power, and a solar inverter for feeding power generated by the solar generator into a power supply system or a load. The invention also relates to a method for controlling the operation of a solar module including a solar generator for converting incident radiation into electrical power and a solar inverter for feeding the power generated by the solar generator into a power supply system or a load.

A solar module usually has a solar generator including at least one solar cell for converting incident radiation into electrical power, at least one storage capacitor connected in parallel with the solar generator, and a solar inverter for feeding the power generated by the solar generator into a power supply system or a load. In that case, the solar inverter should start to feed power to the power supply system, as far as possible, only if the power of the solar generator is high enough to compensate for the no-load losses of the solar inverter, since otherwise the power still lacking is drawn from the power supply system, which causes unnecessary losses.

One known approach for solving the above problem resides in turning on the solar inverter only when the solar generator voltage exceeds a predetermined threshold value. What is problematic in that case is that the no-load voltage of the solar generator says little about its possible power for feeding to the power supply system. On one hand, it can therefore happen that a sufficient power is available, which is not utilized, even below the threshold value. On the other hand, the case in which the power of the solar generator is too low despite the voltage threshold value being exceeded (for example when the solar cells are partly shaded) can also occur. The solar inverter has to be turned off again in order not to draw power from the power supply system unnecessarily in that case. Under unfavorable light conditions (for example a full moon), that can result in the solar inverter being repeatedly switched on and off, which wears the relays and causes noise.

A second approach to a solution is known, which involves loading the solar generator with a resistance. In that case, however, for desirably good functioning, the constant value of the resistance has to be coordinated with the respective solar generator used by the customer and other boundary conditions (for example power supply system voltage, illumination conditions), which is very complicated and significantly increases the production costs.

BRIEF SUMMARY OF THE INVENTION

It is accordingly an object of the invention to provide a solar module and a method of controlling operation of a solar module, which overcome the hereinafore-mentioned disadvantages of the heretofore-known devices and methods of this general type and which, in particular, permit power to be fed to a power supply system by a solar inverter only when the power of a solar generator is sufficient.

With the foregoing and other objects in view there is provided, in accordance with the invention, a solar module, comprising a solar generator for converting incident radiation into electrical power, a solar inverter for feeding power generated by the solar generator into a power supply system or a load, and a variable bias load connected in parallel with the solar generator. A control device drives the variable bias load, detects a presently available power of the solar generator and a present no-load loss of the solar inverter, compares the detected power of the solar generator and the detected no-load loss of the solar inverter and enables the power of the solar generator to be fed into the power supply system or the load by the solar inverter only when the detected power of the solar generator exceeds the detected no-load loss of the solar inverter.

With the objects of the invention in view, there is also provided a method for controlling operation of a solar module. The method comprises providing a solar generator for converting incident radiation into electrical power, providing a solar inverter for feeding power generated by the solar generator into a power supply system or a load, detecting a presently available power of the solar generator, detecting a present no-load loss of the solar inverter, comparing the detected power of the solar generator and the detected no-load loss of the solar inverter, and feeding the power of the solar generator into the power supply system or the load by the solar inverter only when the detected power of the solar generator exceeds the detected no-load loss of the solar inverter.

The solar generator is loaded through the use of the variable bias load, in which case the available power of the solar generator can be determined exactly by suitable driving of the bias load. This enables power to be fed to the power supply system by the solar inverter precisely when the generator power compensates for the no-load losses of the solar inverter. Unnecessary relay switching is prevented, and a seamless transition to power-feeding operation without power losses is possible.

In accordance with another feature of the invention, the control device enables the power of the solar generator to be fed into the power supply system or the load by the solar inverter only when the detected power of the solar generator exceeds the detected no-load loss of the solar inverter for a predetermined minimum time duration. This enables a more stable function of the solar module, for example in the case of a fluctuating generator power.

In accordance with a further feature of the invention, the control device detects the power of the solar generator at an optimum operating point of the solar generator or of the entire solar module.

In accordance with an added feature of the invention, the control device may, for example, be a microcontroller integrated into the solar inverter.

In accordance with an additional feature of the invention, the variable bias load may optionally be embodied in linear fashion (loading adjustable in analogue fashion) or in clocked fashion (loading adjustable by way of on/off ratio).

In accordance with yet another feature of the invention, at least one storage capacitor is connected in parallel with the solar generator, and the control device discharges the at least one storage capacitor through the bias load as required (for example opening the housing for service purposes or for production tests). In this case, the bias load may additionally be assigned an indicating device for indicating a discharge current through the bias load, in order to indicate a charge state of the storage capacitors in this way.

In accordance with yet a further feature of the invention, a plurality of series-connected storage capacitors are connected in parallel with the solar generator, and a variable bias load is assigned to each of the plurality of storage capacitors. Given a symmetrical configuration, the variable bias loads can simultaneously serve in this case for balancing the storage capacitors.

With the objects of the invention in view, there is furthermore provided a solar module, comprising a solar generator for converting incident radiation into electrical power, at least one storage capacitor connected in parallel with the solar generator, a solar inverter for feeding power generated by the solar generator into a power supply system or a load, a variable bias load connected in parallel with the solar generator, and a control device discharging the at least one storage capacitor through the bias load as required.

With the objects of the invention in view, there is additionally provided a method for controlling operation of a solar module. The method comprises providing a solar generator for converting incident radiation into electrical power, providing at least one storage capacitor connected in parallel with the solar generator, providing a solar inverter for feeding power generated by the solar generator into a power supply system or a load, providing a bias load connected in parallel with the solar generator, and discharging the at least one storage capacitor through the bias load, as required.

With the objects of the invention in view, there is concomitantly provided a solar module, comprising a solar generator for converting incident radiation into electrical power, a plurality of series-connected storage capacitors connected in parallel with the solar generator, a solar inverter for feeding power generated by the solar generator into a power supply system or a load, and a plurality of variable bias loads each being associated with a respective one of the storage capacitors.

It is possible to achieve a balancing of the storage capacitors through the use of the bias load.

Other features which are considered as characteristic for the invention are set forth in the appended claims.

Although the invention is illustrated and described herein as embodied in a solar module and a method of controlling operation of a solar module, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
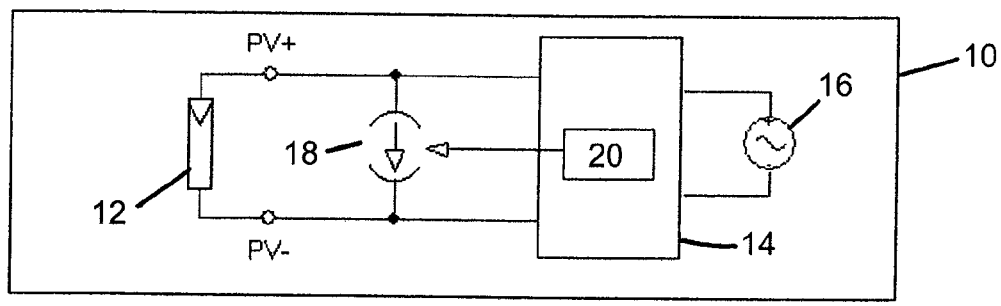
FIG. 1 is a greatly simplified schematic and block diagram of a solar module in accordance with a first exemplary embodiment of the present invention.

Referring now to the figures of the drawings in detail and first, particularly, to FIG. 1 thereof, there is seen a solar module in accordance with a first exemplary embodiment of the invention, which will now be explained in more detail with regard to its construction and function.

The solar module 10 contains, in a well-known manner, a solar generator 12 including at least one solar cell for converting incident light into electrical power and a solar inverter 14 for feeding the power generated by the solar generator 12 into a power supply system, grid or mains 16 or a load. As is illustrated in FIG. 1, the solar module 10 is additionally provided with a variable bias load 18, which is connected in parallel with the solar generator 12 (and a storage capacitor that is likewise present, if appropriate). The variable bias load 18 is driven by a microcontroller or control device 20 integrated in the solar inverter 14.

The solar module 10 functions as follows:

Before the solar inverter 14 is connected to the power supply system 16, the solar generator 12 is loaded with the aid of the variable bias load 18. In this case, the loading is set by the microcontroller 20 in such a way that the instantaneously available power of the solar generator 12 can be measured at an optimum operating point. At the same time, the microcontroller 20 calculates the no-load losses of the solar inverter 14 that would result instantaneously upon connection of the power supply system 16. The no-load losses are principally dependent on the power supply system voltage and the solar generator voltage, and their profile depends greatly on the topology of the solar inverter 14.

If the measured power of the solar generator 12 exceeds the calculated no-load losses of the solar inverter 14, then the microcontroller 20 connects the solar inverter 14 to the power supply system 16 or the load. Since the solar generator 12 is already at the optimum operating point, a seamless transition to power feeding operation without power losses is possible.

Further connection conditions can be used for the solar inverter 14 in order to achieve a stable function of the solar module 10 even in the event of fluctuating generator power. By way of example, sufficient generator power must be available for a predetermined minimum time duration.

The operating point at which the power of the solar generator 12 is measured may be the MPP (maximum power point) of the solar generator 12. More preferably, however, measurement is effected at an operating point which represents the MPP for the entire solar module 10. This is possible without operation of the solar inverter 14, since the losses thereof and their dependence on power supply system voltage and generator voltage are known.

The operating point can optionally be chosen to be fixed or in a manner dependent on various parameters (e.g. power supply system voltage). It can additionally be optimized through the use of tracking and self-learning functions.

The variable bias load 18 of the solar generator 12 can optionally be embodied in linear fashion, that is to say with loading adjustable in analogue fashion, or in clocked fashion, that is to say with loading adjustable by way of an on/off ratio.

No additional measuring devices are required in the solar module 10 for the operation of the bias load 18 as described above, since the voltages on the side of the generator 12 and the side of the power supply system 16 have to be measured anyway. If the U/I characteristic curve of the bias load 18 is known, the measurement of the solar generator current can additionally be dispensed with.

Figure 2:
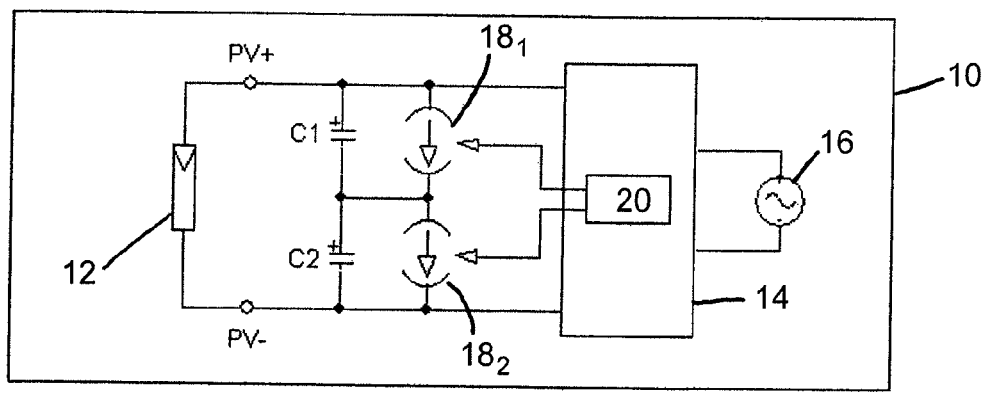
FIG. 2 is a greatly simplified schematic and block diagram of a solar module in accordance with a second exemplary embodiment of the present invention.

Referring to FIG. 2, a second exemplary embodiment of a solar module will now be explained in more detail. In this case, identical or analogous components are identified by the same reference numerals, and only the differences with respect to the first exemplary embodiment of FIG. 1 are described below.

A series circuit including a plurality (two in this case) of storage capacitors C1, C2 is connected in parallel with the solar generator 12 in a known manner. Each of the storage capacitors C1, C2 is assigned a variable bias load $18_1$, $18_2$ in the manner of a bridge circuit, as is illustrated in FIG. 2. All of the bias loads $18_1$, $18_2$ are driven by the microcontroller 20 of the solar inverter 14.

The dimensioning of the storage capacitors C1, C2 is usually very large and they can be charged to above 800 V, for example. The bias loads $18_1$, $18_2$ can be used to eliminate these charges of the storage capacitors C1, C2 in a short time, which is advantageous, for example, during production and servicing. For this purpose, the storage capacitors C1, C2 are discharged through the bias loads $18_1$, $18_2$ through the use of corresponding driving by the microcontroller 20.

This discharge function of the bias loads can also be utilized, of course, in an analogous manner for just one storage capacitor or more than two storage capacitors, with a corresponding number of bias loads.

Due to the high voltages, the storage capacitor is often embodied as a series circuit formed by a plurality of electrolytic capacitors C1, C2, as is illustrated in FIG. 2. In this case, given a symmetrical configuration, the variable bias loads $18_1$, $18_2$ can simultaneously serve for balancing the storage capacitors C1, C2.

Beside the functions of discharging and balancing the storage capacitors C1, C2 as described herein, the bias loads $18_1$, $18_2$ also serve, of course, in this second exemplary embodiment, analogously to the first exemplary embodiment of FIG. 1 as described above, for enabling the solar inverter 14 to feed power to the power supply system 16 only when the solar generator 12 has a sufficient power, which will not be described in detail again at this point.

Figure 3:
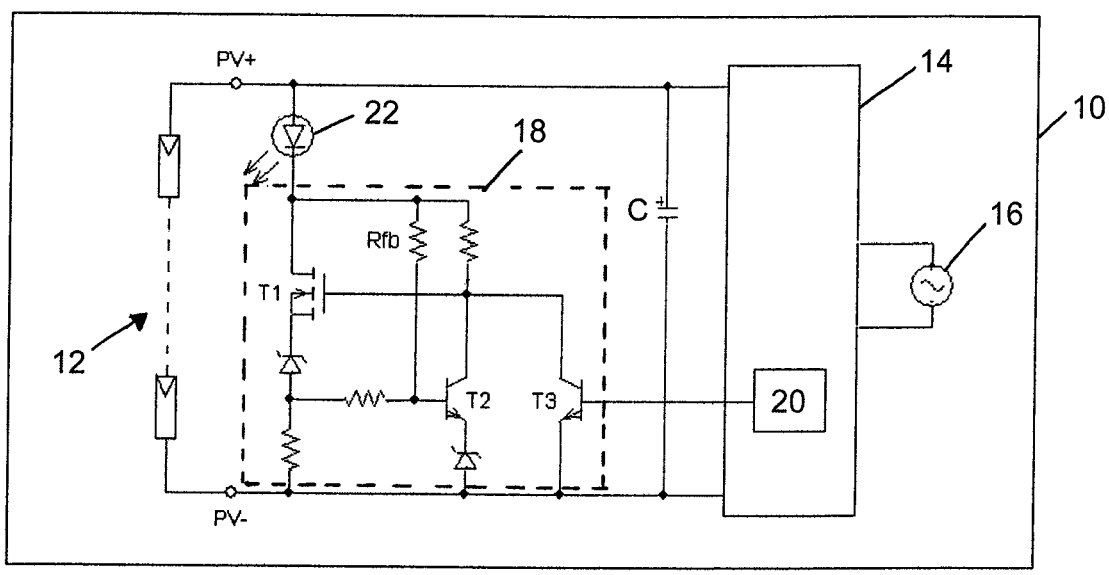
FIG. 3 is a more detailed schematic and block diagram of the solar module of FIG. 1.

Referring to FIG. 3, a possible realization of a bias load such as can be used in the solar modules of FIGS. 1 and 2, will now be explained in greater detail.

The construction of the solar module 10 substantially corresponds to that of FIG. 1, apart from the fact that a storage capacitor C is additionally provided. The storage capacitor C is connected in parallel with the solar generator 12 and the solar inverter 14.

In the variable bias load 18, which is driven by the microcontroller 20 integrated in the solar inverter 14, two transistors T1 and T2 form a current sink which is influenced through the use of a feedback resistor Rfb in such a way that the absorbed power is approximately constant in a wide range. In contrast to a discharge resistor that discharges less and less current as the capacitor voltage becomes smaller and smaller, in this case the current rises more and more, whereby the discharge time of the storage capacitor C is very much shorter. By virtue of the limited power, the circuit exhibits continuous load endurance independently of the solar generator voltage.

The microcontroller 20 can switch the bias load 18 on and off through a transistor T3. The loading of the solar generator 12 by the bias load 18 is controlled by way of the on/off ratio.

In order to determine the available solar generator power, the solar generator voltage is regulated in the manner of a two-point regulator by the bias load 18 being switched on and off. The voltage at the operating point is chosen in a manner dependent on the power supply system voltage. With the aid of the duty ratio produced during the regulation, the measured solar generator voltage and the known U/I characteristic curve of the bias load 18, the microcontroller 20 calculates the instantaneously available power of the solar generator 12 in order to compare it with the no-load losses of the solar inverter 14.

During the discharge function, the bias load 18 is automatically activated as soon as the solar inverter 14 is disconnected from the power supply system 16 or a dangerous state (e.g. opened housing, malfunction in the device) is identified. An indicating device 22 embodied as an LED in the discharge branch lights up due to discharge current as long as the storage capacitor C is not yet totally discharged.

It goes without saying that the construction of the bias load 18 as illustrated in FIG. 3 can also be applied, in an analogous manner, to a solar module 10 of the second exemplary embodiment with two or more storage capacitors C1, C2.

The invention claimed is:

1. A solar module, comprising:
   a solar generator for converting incident radiation into electrical power;
   a solar inverter for feeding power generated by said solar generator into a power supply system or a load;
   a variable bias load connected in parallel with said solar generator; and
   a control device driving said variable bias load, detecting a presently available power of said solar generator and a present no-load loss of said solar inverter, comparing the detected power of said solar generator and the detected no-load loss of said solar inverter and enabling the power of said solar generator to be fed into the power supply system or the load by said solar inverter only when the detected power of said solar generator exceeds the detected no-load loss of said solar inverter.

2. The solar module according to claim 1, wherein said control device enables the power of said solar generator to be fed into the power supply system or the load by said solar inverter only when the detected power of said solar generator exceeds the detected no-load loss of said solar inverter for a predetermined minimum time duration.

3. The solar module according to claim 1, wherein said control device detects the power of said solar generator at an optimum operating point of said solar generator or of the solar module as a whole.

4. The solar module according to claim 1, wherein said control device is a microcontroller integrated into said solar inverter.

5. The solar module according to claim 1, wherein said variable bias load is linear or clocked.

6. The solar module according to claim 1, which further comprises:
   at least one storage capacitor connected in parallel with said solar generator;
   said control device discharging said at least one storage capacitor through said bias load as required.

7. The solar module according to claim 6, which further comprises an indicating device associated with said bias load for indicating a discharge current through said bias load.

8. The solar module according to claim 1, which further comprises:
   a plurality of series-connected storage capacitors connected in parallel with said solar generator;
   said variable bias load being one of a plurality of variable bias loads each associated with a respective one of said plurality of storage capacitors.

9. A method for controlling operation of a solar module, the method comprising the following steps:
- providing a solar generator for converting incident radiation into electrical power;
- providing a solar inverter for feeding power generated by the solar generator into a power supply system or a load;
- providing a variable bias load connected in parallel with the solar generator;
- detecting a presently available power of the solar generator;
- detecting a present no-load loss of the solar inverter;
- comparing the detected power of the solar generator and the detected no-load loss of the solar inverter; and
- feeding the power of the solar generator into the power supply system or the load by the solar inverter only when the detected power of the solar generator exceeds the detected no-load loss of the solar inverter.

10. The method according to claim 9, which further comprises feeding the power of the solar generator into the power supply system or the load by the solar inverter only when the detected power of the solar generator exceeds the detected no-load loss of the solar inverter for a predetermined minimum time duration.

11. The method according to claim 9, which further comprises detecting the power of the solar generator at an optimum operating point of the solar generator or of the solar module as a whole.

12. The method according to claim 9, which further comprises:
- providing at least one storage capacitor connected in parallel with the solar generator; and
- discharging the at least one storage capacitor through the bias load, as required.

13. The method according to claim 12, which further comprises indicating a discharge current through the bias load.

14. A solar module, comprising:
- a solar generator for converting incident radiation into electrical power;
- at least one storage capacitor connected in parallel with said solar generator;
- a solar inverter for feeding power generated by said solar generator into a power supply system or a load;
- a variable bias load connected in parallel with said solar generator; and
- a control device discharging said at least one storage capacitor through said bias load as required.

15. A method for controlling operation of a solar module, the method comprising the following steps:
- providing a solar generator for converting incident radiation into electrical power;
- providing at least one storage capacitor connected in parallel with the solar generator;
- providing a solar inverter for feeding power generated by the solar generator into a power supply system or a load;
- providing a bias load connected in parallel with the solar generator; and
- discharging the at least one storage capacitor through the bias load, as required.

16. A solar module, comprising:
- a solar generator for converting incident radiation into electrical power;
- a plurality of series-connected storage capacitors connected in parallel with said solar generator;
- a solar inverter for feeding power generated by said solar generator into a power supply system or a load; and
- a plurality of variable bias loads each being associated with a respective one of said storage capacitors.

* * * * *